UNITED STATES PATENT OFFICE.

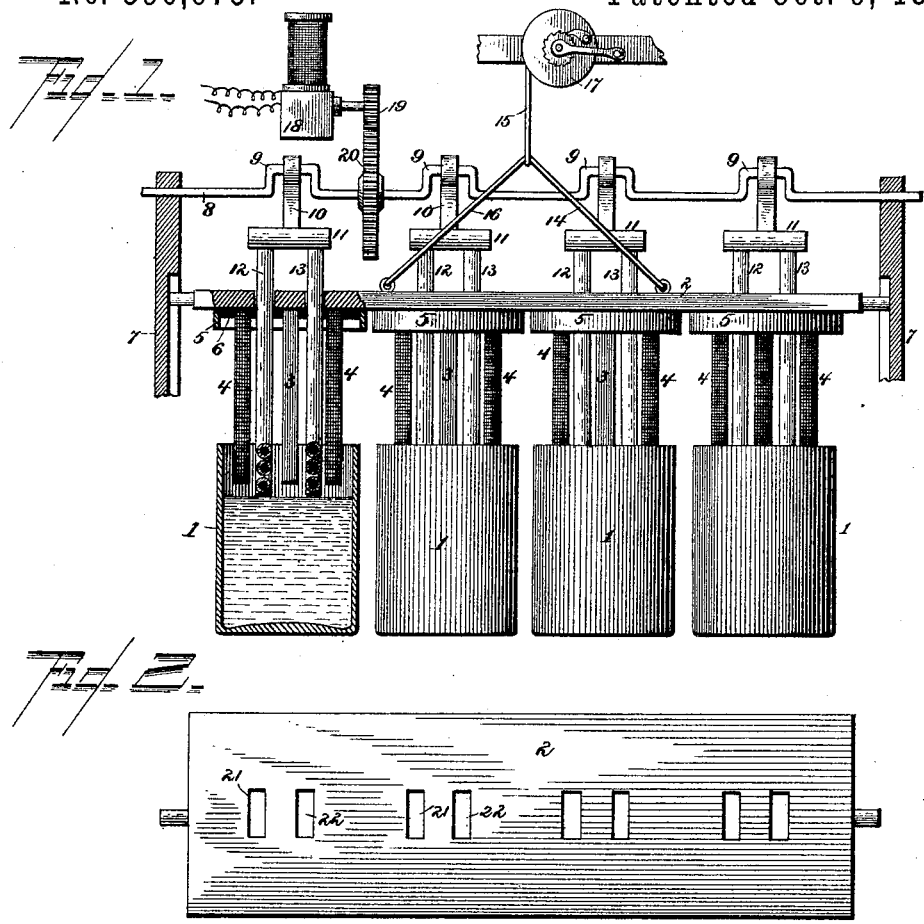

DAVID HUMPHREYS, OF CINCINNATI, OHIO.

GALVANIC BATTERY.

SPECIFICATION forming part of Letters Patent No. 390,675, dated October 9, 1888.

Application filed March 8, 1888. Serial No. 266,524. (No model.)

*To all whom it may concern:*

Be it known that I, DAVID HUMPHREYS, a citizen of the United States, residing at Cincinnati, in the county of Hamilton and State of Ohio, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to galvanic batteries of that type in which a circulation of the exciting-fluid and a dislodgment of any polarizing gases which may accumulate on the surface of the negative electrode are effected. Heretofore it has been proposed to effect depolarization by rotating the negative elements, so as to cause the surface of the said elements to alternately come in contact with the atmosphere and with the exciting-liquid. The theory of operation of such cells is that the hydrogen will be dislodged by the movement of the electrodes and will be dissipated in the open air. It has also been proposed to provide the negative electrodes with superficial points or protuberances, so that the hydrogen may escape from said points.

According to my invention the elements remain fixed when the battery is in action, and an agitator is provided to cause a fresh liquid-surface to be constantly maintained at the negative electrodes to dislodge any hydrogen which may accumulate on said electrodes and cause bubbles or currents of air to be set up near to or in contact with said electrodes, so as to neutralize and dislodge said hydrogen.

My invention embodies certain features of structure with these ends in view, which will be hereinafter fully described in the specification, and then definitely indicated in the appended claims.

In the drawings which illustrate my system, Figure 1 is an elevation of my apparatus. Fig. 2 is a plan view of the cover for the battery-jars. Fig. 3 is a detached, partly sectional, view of the agitating and depolarizing device.

1 1 1 1 represent a series of battery jars or cells. A board or electrode-support, 2, is mounted so as to slide in side guides, 7 7. This support carries the positive and negative elements of the batteries 3 4 4 3 4 4, &c. The positive elements 3 3 3, &c., are preferably of zinc, and the negative elements 4 4 of each cell are preferably of carbon and are placed so as to oppose the faces of the zinc. On the under side of the support 2 is mounted a box-like cover, 5, for each cell, a suitable packing-ring, 6, of soft rubber or other suitable material, being placed within the cover, so as to make a liquid-tight joint when the electrode-support 2 is lowered upon the cells. To the electrode-support is attached suitable sustaining-cords, 14 15 16, which may be wound upon or unwound from a windlass, 17, to raise or lower the electrodes or elements into operative relation to the battery-cells. The windlass is provided with a pawl and a ratchet to hold the electrodes at any point of elevation, as shown. The support 2 is provided with a series of slots, 21 22 21 22, two such slots corresponding to each cell of battery. Through these slots extends the depolarizing device. This is preferably made of hard rubber or some other material which is not too fragile and will be unaffected by the solutions used in galvanic batteries. As shown in the drawings, it consists of a rod, 10, sleeved or hung at the top to the crank-shaft 8. To this rod a cross-piece, 11, is secured, and vertical rods 12 13 are connected rigidly to the cross-piece. To the lower part of each of these vertical rods is attached a hollow frame composed of tubular cross-arms 27 28 29 30 31 32, secured to a central tube, 33, open at the bottom.

Each cross arm is perforated with a series of holes opening toward the carbon or negative electrode surface. One or more of these may be closed at the ends. These cross-arms are preferably secured to the central tube at such distances apart that all of the arms may be alternately lifted out of and depressed into the exciting-liquid at each rotation of the crank-shaft. The vertical rods are placed at such a distance apart that the openings in the perforated cross-arms will be brought into close relation to the negative surface.

The rods 10, of which there is one for each cell of the battery, are hung upon bends or cranks 9 9 9 of a crank-shaft, 8, so that the depolarizing device may be raised and lowered and reciprocated from side to side when said crank-shaft is turned. On the crank-shaft is a gear-wheel, 20, securely fixed to the same, and this gear-wheel is revolved by an electric or other motor, 18, and pinion 19.

The operation of the apparatus will now be understood.

The battery-jars are supplied with an excitant, for which a solution of bichromate of potash or soda, water, and sulphuric acid may be adopted, although any solution which will attack the positive or soluble electrode when the circuit is complete may be used.

Fairly good results may be obtained by this apparatus with a simple acid solution or a solution of a salt of sal-ammoniac or chloride of sodium, since the polarizing-hydrogen, which unfits such batteries for use where the current remains for any length of time on closed circuit, is reduced or dislodged by my apparatus and the electro-motive force of the battery is maintained. The motor is set in operation and the agitator and the depolarizer are reciprocated vertically and laterally. On each upward movement the cross-arms 27 28 29 30 31 32 are lifted out of the excitant and the liquid they contain flows out. They fill with air, which is carried down into the excitant on the downward movement of the crank-shaft. This air is discharged upon or in close relation to the negative surface, and will give up its oxygen to the nascent hydrogen on the said surface. Such bubbles of air as do not reach the hydrogen escape upwardly and disturb the excitant and contribute to the effort exerted by the reciprocation of the agitator to dislodge the hydrogen from said negative surface. In addition to this the vertical and lateral reciprocation of these arms creates currents in the excitant and causes the whole body of said excitant to be uniformly mixed, so that if any part of said excitant becomes weakened by the action of the battery the fresh parts will be brought into action and the whole bulk be made to contribute its full force to the action of the battery. Moreover, if any salts of decomposition should adhere to the soluble electrode, these currents will remove the same and leave a clean surface for the fluid to attack, and any hydrogen at the negative surface which may not be reduced by the depolarizing-liquid of the battery, if such be used, and which may also escape the depolarizing influence of the air-bubbles, will be mechanically dislodged by these currents created by the agitation. It will be seen, therefore, that my apparatus reduces the hydrogen in three ways: first, by the chemical action of the excitant; second, by the action of air, and, third, by agitation of the excitant produced by the joint effort of escaping air and a mechanical agitator.

Having thus described my invention, what I claim as new, and desire to secure by Letters Patent, is—

1. The combination of a galvanic battery, a reciprocating depolarizing device in operative relation to the negative surface of said battery, a motor for bringing said depolarizer alternately into the air and the excitant, whereby the excitant is agitated and air is brought into contact with the negative surface.

2. A battery-depolarizer comprising a rod extending into the excitant near the negative electrode, hollow arms carried by said rod, and a motor for reciprocating said arms into and out of the excitant, as and for the purpose set forth.

3. A battery-depolarizer comprising a rod extending into the excitant, hollow arms carried by said rod, perforations in said arms, and a motor for reciprocating said rod and bringing said arms into and out of the excitant, as and for the purpose set forth.

4. In a galvanic battery, the combination of the positive and negative electrodes, the latter opposing both faces of the former, an agitator between the opposing faces, a shaft, and connections between the shaft and agitator for bringing the agitator alternately into the air and the excitant.

5. In a galvanic battery, the combination of the positive and negative electrodes, the latter opposing both faces of the former, a depolarizer comprising vertical arms extending between the opposing faces of the electrodes, said arms provided with hollow lateral extensions perforated opposite the negative surface, and a motor and crank-shaft for reciprocating said depolarizer and bringing the lateral extensions alternately into and out of the excitant.

6. In a galvanic battery, the combination of a cell, a slotted cover for said cell, an agitator extending through the slots in the cover, and a motor for reciprocating the agitator.

7. In a galvanic battery, the combination of a series of cells, a cover common to all the cells, an agitator for each cell extending through slots in the cover, and a crank-shaft for reciprocating the agitator.

8. In a galvanic battery, the combination of a series of cells, a cover common to all the cells, an agitator for each cell extending through slots in the cover, a crank-shaft for reciprocating the agitator, and means for raising and lowering the cover.

9. The combination, with a galvanic battery, of a depolarizer and agitator consisting of a rod provided with air-recesses, and a motor for reciprocating the rod and bringing said recesses alternately into and out of the excitant.

10. The combination, with a galvanic battery, of a depolarizer and agitator consisting of a rod provided with hollow lateral perforated extensions, the perforations opposing the electrodes, one or more of said extensions being closed at the ends, and a motor for reciprocating the extensions into and out of the excitant.

In testimony whereof I affix my signature in presence of two witnesses.

DAVID HUMPHREYS.

Witnesses:
ROBT. H. READ,
M. P. CALLAN.